(12) United States Patent
Park et al.

(10) Patent No.: US 10,203,573 B2
(45) Date of Patent: Feb. 12, 2019

(54) DISPLAY DEVICE

(71) Applicant: LG DISPLAY CO., LTD., Seoul (KR)

(72) Inventors: Misun Park, Gwangmyeong-si (KR); SungLim Nam, Paju-si (KR); WonJun Choi, Paju-si (KR); Jaewoong Choi, Anyang-si (KR); Younghyun Kong, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 105 days.

(21) Appl. No.: 15/244,485

(22) Filed: Aug. 23, 2016

(65) Prior Publication Data

US 2017/0082888 A1 Mar. 23, 2017

(30) Foreign Application Priority Data

Sep. 18, 2015 (KR) .................... 10-2015-0132557

(51) Int. Cl.
  *G02F 1/1345* (2006.01)
  *G02F 1/1339* (2006.01)
  *G02F 1/1333* (2006.01)

(52) U.S. Cl.
  CPC ........ *G02F 1/13458* (2013.01); *G02F 1/1339* (2013.01); *G02F 1/13452* (2013.01); *G02F 1/133308* (2013.01); *G02F 2001/133314* (2013.01); *G02F 2001/133317* (2013.01)

(58) Field of Classification Search
  CPC ... G02F 1/133308; G02F 2001/133314; G02F 2001/133317
  See application file for complete search history.

(56) References Cited

U.S. PATENT DOCUMENTS

| 6,601,947 | B1* | 8/2003 | Sato ..................... B41J 2/14233 347/68 |
| 2007/0120152 | A1 | 5/2007 | Chang et al. |
| 2010/0097551 | A1* | 4/2010 | Yamagishi ............ G02F 1/1345 349/115 |
| 2011/0115364 | A1 | 5/2011 | Kim |
| 2011/0187965 | A1* | 8/2011 | Ooishi .................... G09F 13/04 349/62 |
| 2015/0179670 | A1 | 6/2015 | Kang et al. |

FOREIGN PATENT DOCUMENTS

| GB | 2544374 A | | 5/2017 |
| KR | 20090059624 A | | 6/2009 |
| KR | 20110110548 A | * | 10/2011 |
| KR | 20140136237 A | | 11/2014 |
| KR | 20150072743 A | | 6/2015 |

\* cited by examiner

*Primary Examiner* — Alexander Gross
(74) *Attorney, Agent, or Firm* — Dentons US LLP

(57) ABSTRACT

A display panel according to various embodiments comprises: a first substrate and a second substrate facing each other; a first pad and a second pad between the first substrate and the second substrate at an end of the first substrate; a first connection electrode on a side face of the first pad and a second connection electrode on a side face of the second pad; an insulating layer disposed on a top face of the first substrate and disposed on at least a portion of a top face of the first and second pads; and at least one spread prevention hole in the insulating layer between the first and second pads.

23 Claims, 7 Drawing Sheets

DISPLAY DEVICE

CROSS REFERENCE TO RELATED APPLICATIONS

This application claims the benefit of Korean Patent Application No. 10-2015-0132557 filed on Sep. 18, 2015, which is hereby incorporated by reference in its entirety.

BACKGROUND

Field of the Disclosure

The present invention relates to a display device and a method for manufacturing the same, and more particularly, to a display device having a structure for connecting a panel driver to a display panel.

Discussion of the Related Art

Display devices such as a liquid crystal display device, a plasma display panel device, and an organic light emitting display device have been developed.

A display device includes a display panel for displaying an image and a panel driver for driving the display panel. A connection structure of the display panel and the panel driver according to the related art will be described below with reference to the accompanying drawings.

FIG. 1A is a schematic plan view of a display device according to the related art and FIG. 1B is a cross-sectional view taken along line I-I in FIG. 1A.

Referring to FIGS. 1A and 1B, a display device according to the related art includes a lower substrate 10, an upper substrate 20, a flexible printed circuit film 40, and a printed circuit board 50.

A combination of the lower substrate 10 and the upper substrate 20 constitutes the display panel, and a combination of the flexible printed circuit film 40 and the printed circuit board 50 constitutes the panel driver.

Various signal lines (not illustrated) are disposed in the lower substrate 10, and signal pads 11 are formed at the ends of the signal lines. The signal pads 11 are connected to the flexible printed circuit film 40. More specifically, the flexible printed circuit film 40 is bonded to the top faces of the signal pads 11. Accordingly, the top faces of the signal pads 11 are exposed. That is, the lower substrate 10 further extends than the upper substrate 20, and the signal pads 11 are formed on the top face of the extended lower substrate 10. The flexible printed circuit film 40 is connected to the printed circuit board 50.

Such a display device according to the related art may have disadvantages in that the size of a bezel area increases as the top faces of the signal pads 11 are exposed for an electrical connection to the flexible printed circuit film 40. Also, stepped portions may be present in the bezel area, which may limit implementation of various beautiful appearances.

SUMMARY

Accordingly, embodiments of the present disclosure are directed to a display device that substantially obviates one or more problems due to limitations and disadvantages of the related art.

An aspect of embodiments of the present invention is directed to provide a display device in which a bezel area can be reduced and a stepped portion in the bezel area can be removed.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, a display panel may, for example, include a first substrate and a second substrate facing each other; a first pad and a second pad between the first substrate and the second substrate at an end of the first substrate; a first connection electrode on a side face of the first pad and a second connection electrode on a side face of the second pad; an insulating layer disposed on a top face of the first substrate and disposed on at least a portion of a top face of the first and second pads; and at least one spread prevention hole in the insulating layer between the first and second pads.

In one or more embodiments, the side face of the first pad and the side face of the second pad correspond to the end of the first substrate, and an end of the at least one spread prevention hole is exposed at the end of the first substrate.

In one or more embodiments, the end of the first substrate and an end of the second substrate match each other.

In one or more embodiments, the at least one spread prevention hole is separated from the first and second pads.

In one or more embodiments, the at least one spread prevention hole overlaps one of the first and second pads.

In one or more embodiments, the display panel further comprises a sealant disposed between the first substrate and the second substrate, wherein the sealant is separated from the at least one spread-prevention hole.

In one or more embodiments, the display panel further comprises a first auxiliary electrode and a second auxiliary electrode on the insulating layer, wherein the first auxiliary electrode is connected to the first pad via at least one first contact hole in the insulating layer and is connected to the first connection electrode, and wherein the second auxiliary electrode is connected to the second pad via at least one second contact hole in the insulating layer and is connected to the second connection electrode.

In one or more embodiments, each connection electrode is in contact with the side face of the respective pad, and with an end face and a top face of the respective auxiliary electrode.

In one or more embodiments, each connection electrode is connected with the side face of the respective pad, and with an end face, a top face and a side face of the respective auxiliary electrode.

In one or more embodiments, the spread-prevention hole is in contact with the at least one first contact hole and/or the at least one second contact hole.

In one or more embodiments, a side face of the first auxiliary electrode and/or a side face of the second auxiliary electrode is exposed the at least one spread-prevention hole.

In one or more embodiments, one of the connection electrodes is at least partially located in the at least one spread prevention hole.

A display device according to various embodiments comprises: a display panel according to one or more embodiments described herein; and a flexible printed circuit film bonded to a side face of the display panel.

In one or more embodiments, the flexible printed circuit film is bonded to the side face of the first pad and/or to the side face of the second pad.

In one or more embodiments, the display device further comprises an adhesive layer between the first connection electrode and the flexible printed circuit film and/or between the second connection electrode and the flexible printed circuit film to bond the flexible printed circuit film to the first and/or second connection electrode.

In one or more embodiments, the adhesive layer comprises an adhesive base material and conductive balls within the adhesive base material to electrically connect the first and/or connection electrode with the flexible printed circuit film.

In one or more embodiments, the display device further comprises: a backlight unit; and a buffer member between the flexible printed circuit film and the backlight unit.

In one or more embodiments, the backlight unit comprises: a guide panel that supports the display panel; a lower case coupled to the guide panel; wherein the buffer member is disposed between the flexible printed circuit film and the guide panel.

In one or more embodiments, the buffer member may be formed of an insulation material, for example of polyethylene terephthalate (PET).

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the disclosed subject matter and are incorporated in and constitute a part of this application, illustrate embodiments of the disclosed subject matter and together with the description serve to explain the principle of the disclosed subject matter. In the drawings.

DETAILED DESCRIPTION OF THE ILLUSTRATED EMBODIMENTS

Figure 1A:
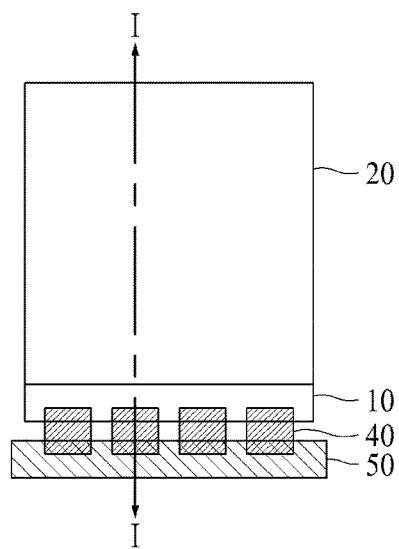
FIG. 1A is a schematic plan view of a display device according to the related art and FIG. 1B is a cross-sectional view taken along line I-I in FIG. 1A.
Figure 1B:
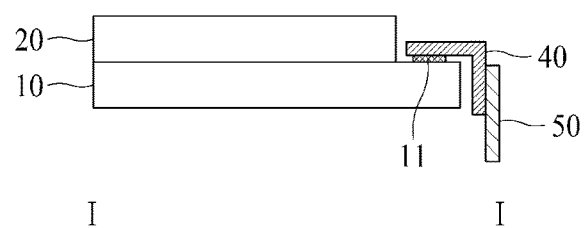

Advantages and features of the invention and methods for achieving the advantages or features will be apparent from embodiments described below in detail with reference to the accompanying drawings. However, the invention is not limited to the embodiments but can be modified in various forms. The embodiments are provided merely for completing the disclosure of the invention and are provided for completely informing those skilled in the art of the scope of the invention. The scope of the invention is defined by only the appended claims.

Shapes, sizes, ratios, angles, number of pieces, and the like illustrated in the drawings, which are provided for the purpose of explaining the embodiments of the invention, are exemplary and thus the invention is not limited to the illustrated details. In the following description, like elements are referenced by like reference numerals. When it is determined that detailed description of the relevant known functions or configurations involved in the invention makes the gist of the invention obscure, the detailed description thereof will not be made. When "include," "have", "be constituted", and the like are mentioned in the specification, another element may be added unless "only" is used. A singular expression of an element includes two or more elements unless differently mentioned.

In construing elements, an error range is included even when explicit description is not made.

For example, when positional relationships between two parts are described using 'on~', 'over~', 'under~' 'next~', and the like, one or more other parts may be disposed between the two parts unless 'just' or 'direct' is used.

For example, when temporal relationships are described using "after", "subsequent to", "next", "before", and the like, such expression may include temporal discontinuity unless "immediately" or "directly" is used.

Terms "first", "second", and the like can be used to describe various elements, but the elements should not be limited to the terms. The terms are used only to distinguish an element from another. Therefore, a first element may be a second element within the technical spirit of the invention.

Features of the embodiments of the invention can be coupled or combined partially or on the whole and can be technically interlinked and driven in various forms. The embodiments may be put into practice independently or in combination.

Hereinafter, the embodiments of the invention will be described in detail with reference to the accompanying drawings.

Figure 2:
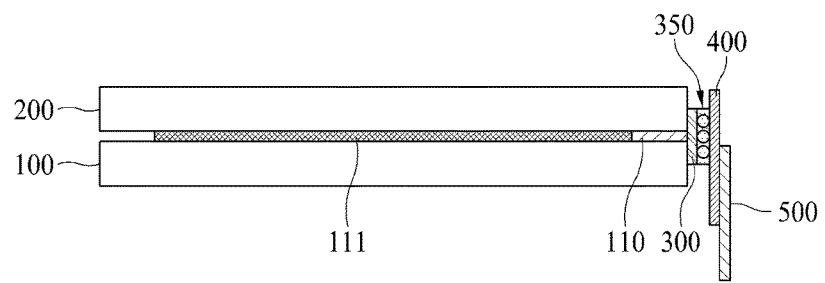
FIG. 2 is a schematic cross-sectional view of a display device according to an embodiment of the present invention.

FIG. 2 is a schematic cross-sectional view of a display device according to an embodiment of the present invention.

As illustrated in FIG. 2, a display device according to an embodiment of the present invention includes a first substrate 100, a second substrate 200, a connection electrode 300, an adhesive layer 350, a flexible printed circuit film 400, and a printed circuit board 500. The first substrate 100 may be a lower substrate, and the second substrate 200 may be an upper substrate, or vice versa.

The first substrate 100 and the second substrate 200 are bonded to each other to constitute a display panel. The flexible printed circuit film 400 and the printed circuit board 500 constitute a panel driver (or at least a portion of a panel driver).

The first substrate 100 and the second substrate face each other, and the first substrate 100 and the second substrate 200 have substantially the same length. One end of the first substrate 100 and one end of the second substrate 200 may match each other, and the other end of the first substrate 100 and the other end of the second substrate may match each other. The one end and the other end of the first substrate 100 may be opposite ends of the first substrate 100. Similarly, the one end and the other end of the second substrate 200 may be opposite ends of the first substrate 200.

The first substrate 100 and the second substrate 200 may further have the same width. Accordingly, the first substrate 100 and the second substrate 200 may have the same shape. For example, the first substrate 100 and the second substrate 200 may have a structure (e.g., quadrangular structure) with the same size. For example, the first substrate 100 and the second substrate 200 may have the same lateral dimensions. For example, all side faces of the first substrate 100 may match the respective side faces of the second substrate 200. For example, the first substrate 100 and the second substrate 200 may be arranged congruently.

Unlike the related art, the first substrate 100 does not extend more than the second substrate 200 in an area to which the flexible printed circuit film 400 is bonded. According to the embodiment of the present invention, in an area to which the flexible printed circuit film 400 is bonded, one end of the first substrate 100 and one end of the second substrate 200 match each other. Since the first substrate 100 does not extend more than the second substrate 200, the flexible printed circuit film 400 is not bonded to the top face of the first substrate 100 but is bonded to a side face of the display panel.

The specific constitutions of the first substrate 100 and the second substrate 200 may vary in various forms depending on a display device to which an embodiment of the present invention is applied.

For example, when the display device according to an embodiment of the present invention is a liquid crystal display device, thin film transistors and pixel electrodes may be formed on the first substrate 100, black matrixes and color filters may be formed on the second substrate 200, and a liquid crystal layer may be formed between the first substrate 100 and the second substrate 200, but the present invention is not limited thereto and the liquid crystal display device may be changed to various forms known in the art, such as a twisted nematic (TN) mode, an in-plane switching (IPS) mode, a vertical alignment (VA) mode, or a fringe field switching (FSS) mode. Also, the constitutions of the first substrate 100 and the second substrate 200 may be changed in various forms depending on various modes. When the display device according to an embodiment of the present invention is an organic light emitting display device, thin film transistors and organic light-emitting elements each including an anode, a light-emitting layer, and a cathode may be formed on the first substrate and the second substrate 200 may be formed of an encapsulated substrate or may be an encapsulation substrate, but the present invention is not limited thereto and the organic light emitting display device may be changed to various forms known in the art.

A wiring 111 is formed on the first substrate 100, and a pad 110 is connected to an end of the wiring 111. The wiring 111 may be a signal line such as a gate line, a data line, or a common voltage line, or may be a non-signal line such as an antistatic line. In the drawing, the pad 110 is formed as one body in the same layer as the wiring 111, but the present invention is not limited thereto. For example, the wiring 111 may be a data line formed on a gate insulating film and the pad 110 may be a data pad formed below the gate insulating film. In this case, the data pad is connected to the data line via a contact hole formed in the gate insulating film.

Since one end of the first substrate 100 and one end of the second substrate 200 substantially match each other in an area in which the pad 110 is formed, the flexible printed circuit film 400 is not connected to the top face of the pad 110 unlike the related art, but is connected to one side face of the pad 110. Since the side face of the pad 110 connected to the flexible printed circuit film 400 has a small area, the connection characteristics to the flexible printed circuit film 400 may not be satisfactory. Accordingly, in order to improve the connection characteristics between the flexible printed circuit film 400 and the pad 110, a connection electrode 300 is formed on one side face of the pad 110.

The connection electrode 300 is formed to be in contact with the side face of the first substrate 100 on which the pad 110 is formed and the side face of the second substrate 200, and is connected directly to one side face of the pad 110. The connection electrode 300 may be formed of silver (Ag) having an excellent conductivity, but the present invention is not limited thereto.

In order to bond the flexible printed circuit film 400 to the connection electrode 300, an adhesive layer 350 is formed between the connection electrode 300 and the flexible printed circuit film 400. The adhesive layer 350 includes conductive balls therein (e.g., in an adhesive base material of the adhesive layer) and electrical connection between the connection electrode 300 and the flexible printed circuit film 400 can be achieved via the conductive balls.

The flexible printed circuit film 400 is not formed on the top face of the first substrate 100 and is disposed vertically on the side faces of the first substrate 100 and the second substrate 200. The flexible printed circuit film 400 is connected to the printed circuit board 500.

Although not illustrated, a chip such as a driver integrated circuit may be formed on the flexible printed circuit film 400 to form a chip-on-film (COF) structure, but the present invention is not limited thereto. A lead wiring is formed on the flexible printed circuit film 400 and the lead wiring is connected to the connection electrode 300 via the conductive balls of the adhesive layer 350.

The printed circuit board 500 supplies various signals to the display panel via the flexible printed circuit film 400. Although not illustrated, a timing control unit, various power supply circuits, a memory element, and the like are mounted on the printed circuit board 500.

According to this embodiment of the present invention, since the connection electrode 300 is connected to the pad 110 on the side faces of the first substrate 100 and the second substrate 200 and thus, the flexible printed circuit film 400 is bonded to the side faces of the first substrate 100 and the second substrate 200, it may not be necessary to extend the first substrate 100 more than the second substrate 200 in order to expose the top face of the pad 110 to the outside, unlike the related art. Accordingly, it is possible to reduce the bezel area. Since the ends of the first substrate 100 and the second substrate 200 substantially match each other, it is possible to reduce or prevent a stepped portion in the bezel area.

Figure 3:
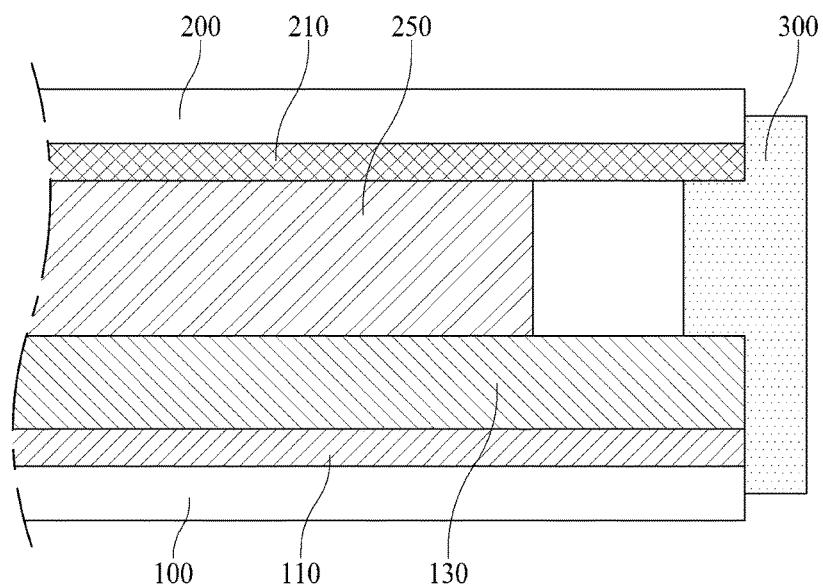
FIG. 3 is a schematic cross-sectional view of a display device according to an embodiment of the present invention.

FIG. 3 is a schematic cross-sectional view of the display device according to the embodiment of the present invention and more specifically illustrates the area in which the connection electrode 300 is formed in FIG. 2. In FIG. 3, the adhesive layer 350, the flexible printed circuit film 400, and the printed circuit board 500 are not illustrated for the purpose of convenience.

Referring to FIG. 3, the ends of the first substrate 100 and the second substrate 200 substantially match each other and the first substrate 100 and the second substrate 200 face each other.

The pad 110 is formed on the first substrate 100 and the insulating layer 130 is formed on the pad 110.

The top face of the pad 110 is covered with the insulating layer 130, but one side face of the pad 110 is not covered with the insulating layer 130.

The insulating layer 130 may be formed as a single layer as illustrated in the drawing, but may be formed as multiple layers in some cases. When the insulating layer 130 includes multiple layers, the insulating layer 130 may include a gate insulating film formed on the pad 110 and a planarization film formed on the gate insulating film. The gate insulating film may be formed of an inorganic insulating material such as silicon oxide or silicon nitride and the planarization film may be formed of an organic insulating material such as photoacryl, but the present invention is not limited thereto.

A light-blocking layer 210 is formed on the second substrate 200. Accordingly, light leakage can be reduced or prevented by the light-blocking layer 210.

A sealant 250 is formed between the first substrate 100 and the second substrate 200, and the first substrate 100 and the second substrate 200 are bonded to each other by the sealant 250. The sealant 250 does not extend to an end of the first substrate 100 or the second substrate 200. That is, one end of the sealant does not match the ends of the first substrate 100 and the second substrate 200, but is located inside the ends of the first substrate 100 and the second substrate 200. With this structure, an area in which the sealant 250 is not formed can be made between the first substrate 100 and the second substrate 200 and the connection electrode 300 can extend to the area between the first substrate 100 and the second substrate 200 in which the sealant 250 is not formed. Accordingly, the connection electrode 300 can be more strongly coupled to the first substrate 100 and the second substrate 200.

The connection electrode 300 is formed to be in contact with the side face of the first substrate 100 and the side face of the second substrate 200. Particularly, the connection electrode 300 comes in contact with one side face of the pad 110, which is not covered with the insulating layer 130 but exposed. That is, one side face of the pad 110 is covered with the connection electrode 300.

One end of the connection electrode 300 extends to an inside of the display device more than the side face of the first substrate 100 and the second substrate 200, and thus the connection electrode 300 comes in contact with a top face of the insulating layer 130 formed on the first substrate 100 and also comes in contact with a bottom face of the light-blocking layer 210 formed on the second substrate 200. Accordingly, the connection electrode 300 can be more strongly coupled to the first substrate 100 and the second substrate 200.

Figure 4:
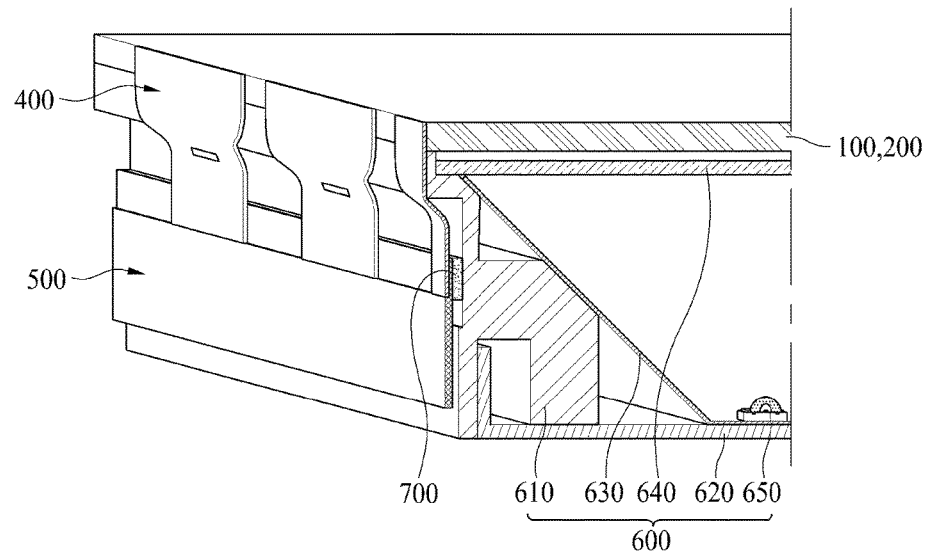
FIG. 4 is a schematic perspective view of a display device according to an embodiment of the present invention.

FIG. 4 is a schematic perspective view of a display device according to an embodiment of the present invention and illustrates a liquid crystal display device to which the above-mentioned display panel is applied.

Referring to FIG. 4, a display device according to an embodiment of the present invention includes a display panel including a first substrate 100 and a second substrate 200, a flexible printed circuit film 400, a printed circuit board 500, a backlight unit 600, and a buffer member 700.

The display panel including the first substrate 100 and the second substrate 200, the flexible printed circuit film 400, and the printed circuit board 500 are the same as described above.

The backlight unit 600 is located below the display panel and supplies light to the display panel. The backlight unit 600 includes a guide panel 610, a lower case 620, a reflective plate 630, an optical sheet 640, and a light source 650.

The guide panel 610 supports the display panel. The lower case 620 is coupled to the guide panel 610 and forms a lower structure of the display device. The reflective plate 630 is located on the lower case 620 and reflects light emitted from the light source 650 to the display panel. The optical sheet 640 is supported by the guide panel 610 and directs the light emitted from the light source 650 to be uniformly incident on the display panel. The light source 650 is formed on the reflective plate 630. Such a backlight unit 600 can be modified in various forms known in the art. For example, a direct type in which plural light sources 650 are located below the display panel and the light emitted from the light sources 650 travels directly upward is illustrated in the drawing, but a light guide plate type in which the light emitted from the light source 650 changes its traveling direction through a light guide plate and travels upward may be employed.

The buffer member 700 is disposed between the flexible printed circuit film 400 and the guide panel 610 and locates the flexible printed circuit film 400 more stably. The flexible printed circuit film 400 extends downward along the guide panel 610 in a state in which the flexible printed circuit film 400 is bonded to the side faces of the first substrate 100 and the second substrate 200, and the printed circuit board 500 also extends downward in a state in which the printed circuit board 500 is connected to the flexible printed circuit film 400. Here, since the buffer member 700 is disposed between the flexible printed circuit film 400 and the guide panel 610, the flexible printed circuit film 400 may not freely move. For example, the buffer member 700 may adhere the guide panel 610 to the flexible printed circuit film 400. The buffer member 700 may be formed of an insulation material, for example, polyethylene terephthalate (PET).

Figure 5:
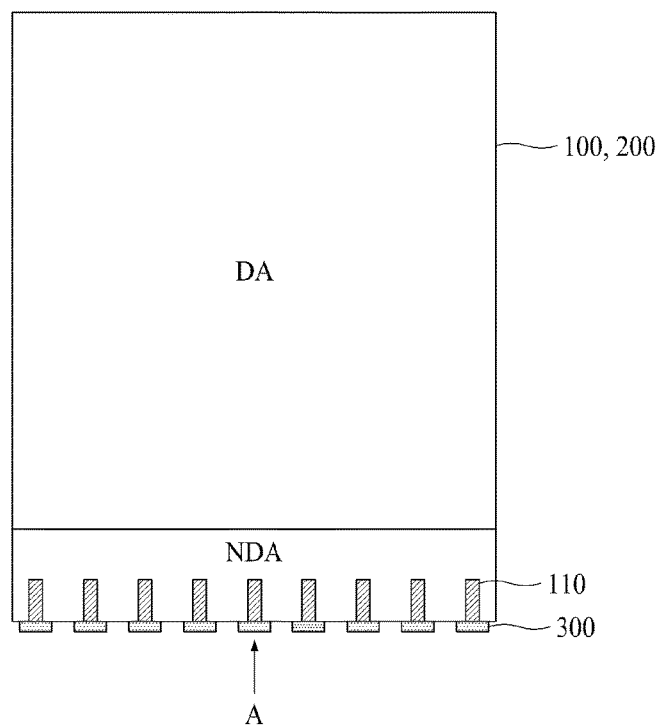
FIG. 5 is a schematic plan view of a display device according to an embodiment of the present invention.
Figure 6:
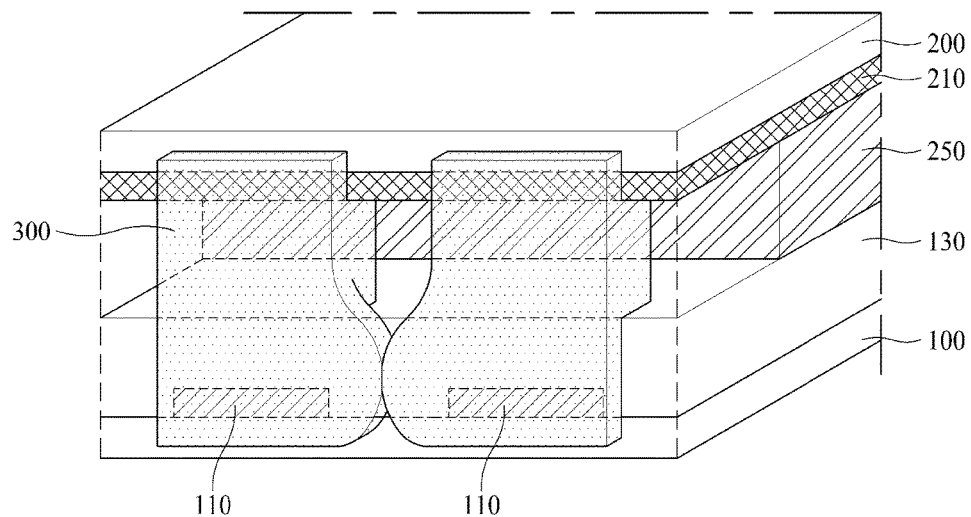
FIG. 6 is a schematic lateral perspective view of a display device according to an embodiment of the present invention.

FIG. 5 is a schematic plan view of a display device according to an embodiment of the present invention and FIG. 6 is a schematic lateral perspective view of a display device according to an embodiment of the present invention. FIGS. 5 and 6 illustrate a state in which plural pads 110 and plural connection electrodes 300 are connected to each other. FIG. 6 is a lateral perspective view when viewed from direction A in FIG. 5, where only two pads 110 and two connection electrodes are illustrated for the purpose of convenience.

Referring to FIG. 5, the first substrate 100 and the second substrate 200 are provided with a display area DA in which an image is displayed and a non-display area NDA which is disposed outside the display area DA.

Plural pads 110 are arranged in the non-display area NDA, and the connection electrodes 300 are connected to ends of the plural pads 110. That is, the plural pads 110 and the plural connection electrodes 300 are connected to form pairs. Although not specifically illustrated, the plural pads 110 are connected to plural wirings (see reference numeral 111 in FIG. 2) disposed in the display area DA.

Referring to FIG. 6, plural pads 110 and the insulating layer 130 are sequentially formed on a top face of the first substrate 100, and the light-blocking layer 210 is formed on a bottom face of the second substrate 200.

Plural connection electrodes 300 are formed on side faces of the first substrate 100 and the second substrate 200. The plural connection electrodes 300 are connected to the plural pads 110, respectively.

Referring back to FIG. 2, the adhesive layer 350 and the flexible printed circuit film 400 are sequentially formed on the connection electrodes 300, and the adhesive layer 350 and the flexible printed circuit film 400 are formed before curing the connection electrodes 300. Accordingly, the connection electrodes 300 may be pressurized during the course of forming the adhesive layer 350 and the flexible printed circuit film 400. In this case, the connection electrodes 300 may spread horizontally to cause a short-circuit between the neighboring connection electrodes 300.

A display device according to another embodiment of the present invention will be described below, which may be advantageous in reducing or preventing a short-circuit between the neighboring connection electrodes 300 even when the connection electrodes 300 are pressurized.

Figure 7:
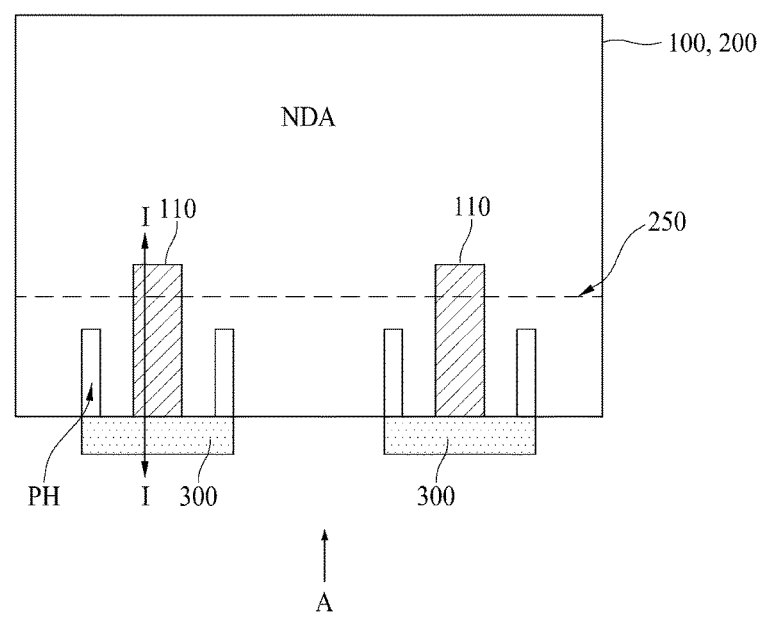
FIG. 7 is a schematic plan view of a display device according to another embodiment of the present invention.

FIG. 7 is a schematic plan view of a display device according to another embodiment of the present invention and illustrates two pads 100 formed in a non-display area NDA of the display device and two connection electrodes 300.

Referring to FIG. 7, the pads 100 are arranged in the non-display area NDA on the first substrate 100 and the second substrate 200, and the connection electrodes 300 are connected to ends of the pads 110.

Here, spread-prevention holes PH are formed on both sides of each pad 110. Particularly, the spread-prevention holes PH are separated from the pad 110 on both sides of the pad 110. The drawing illustrates a state in which the spread-prevention holes PH are formed on both sides of the pad 110, but the present invention is not limited thereto and the spread-prevention hole PH may be formed in only one side of the pad 110. Plural spread-prevention holes PH may be arranged on one side of the pad 110. The spread-prevention holes PH are formed in the insulating layer (see reference numeral 130 in FIG. 8) which is formed on the pads 110.

Accordingly, even when the connection electrodes 300 are pressurized and spread, the spreading connection electrodes 300 permeate the spread-prevention holes PH, thereby reducing or preventing a short-circuit between the neighboring connection electrodes 300. Although a state in which the connection electrodes 300 do not permeate the spread-prevention holes PH is illustrated in the drawing, the connection electrodes 300 can actually permeate the spread-prevention holes PH.

On the other hand, a sealant 250 is formed between the first substrate 100 and the second substrate 200. When the sealant 250 extends to the spread-prevention holes PH and fills the spread-prevention holes PH, the spread-preventing effect of the connection electrodes 300 may be compromised. Accordingly, the sealant 250 does not extend to the spread-prevention holes PH. That is, since the sealant 250 does not extend to the spread-prevention holes PH, the connection electrodes 300 permeate the spread-prevention holes PH and the sealant 250 does not permeate the spread-prevention holes PH. An end of the sealant 250 not extending to the spread-prevention holes PH is indicated by a dotted line in the drawing.

Figure 8:
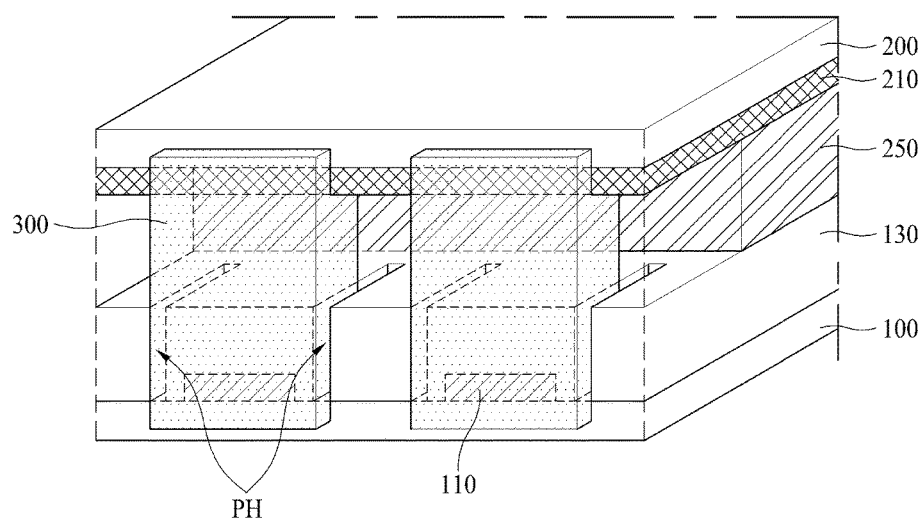
FIG. 8 is a schematic lateral perspective view of a display device according to another embodiment of the present invention.

FIG. 8 is a lateral perspective view of a display device according to another embodiment of the present invention and corresponds to a lateral perspective view when viewed from direction A in FIG. 7.

Referring to FIG. 8, plural pads 110 are separated from each other on a top face of the first substrate 100, and the insulating layer 130 is formed on the plural pads 110 and the first substrate 100.

Here, the spread-prevention holes PH are formed in the insulating layer 130. The spread-prevention holes PH are formed by removing predetermined areas of the insulating layer 130. The spread-prevention holes PH are spaces that can accommodate the connection electrodes 300 when the connection electrodes 300 spread. Accordingly, the cross-sectional shape thereof is not limited to a quadrangle, but may be modified in various forms capable of accommodating the connection electrodes 300. A state in which all the insulating layer 130 is removed in the areas of the spread-prevention holes PH to expose the top face of the first substrate 100 is illustrated in the drawing, but a part of the insulating layer 130 may remain in the areas of the spread-prevention holes PH in some cases. For example, when the insulating layer 130 is formed as a double-layered structure of a gate insulating film and a planarization film, the spread-prevention holes PH may be formed in the areas from which the planarization film is removed by not removing the gate insulating film but removing the planarization film. The sealant 250 does not permeate the spread-prevention holes PH.

The light-blocking layer 210 is formed on a bottom face of the second substrate 200.

The connection electrodes 300 are formed on side faces of the first substrate 100 and the second substrate 200 and are connected particularly to ends of the pads 110. The connection electrodes 300 can permeate the spread-prevention holes PH. However, one connection electrode 300 does not extend to a neighboring connection electrode 300 over the spread-prevention hole PH.

Figure 9A:
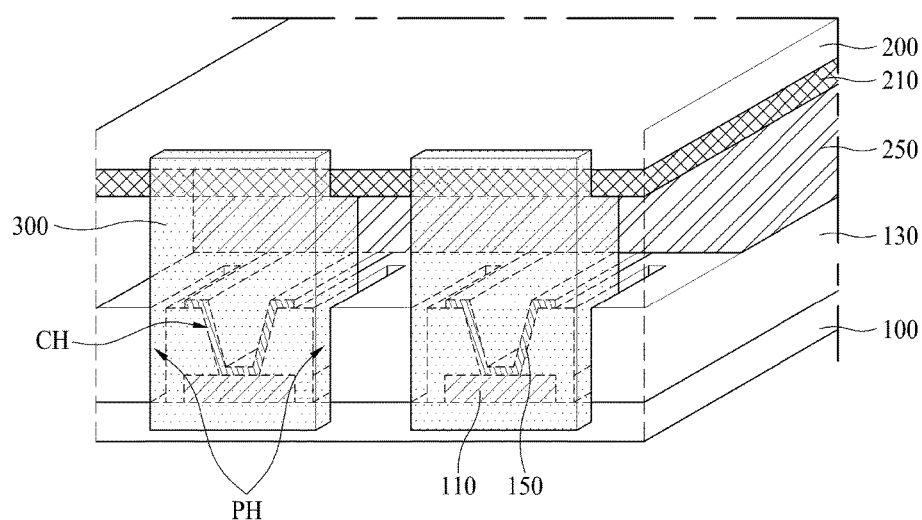
FIG. 9A is a schematic lateral perspective view of a display device according to still another embodiment of the present invention and FIG. 9B is a schematic cross-sectional view of a display device according to still another embodiment of the present invention.
Figure 9B:
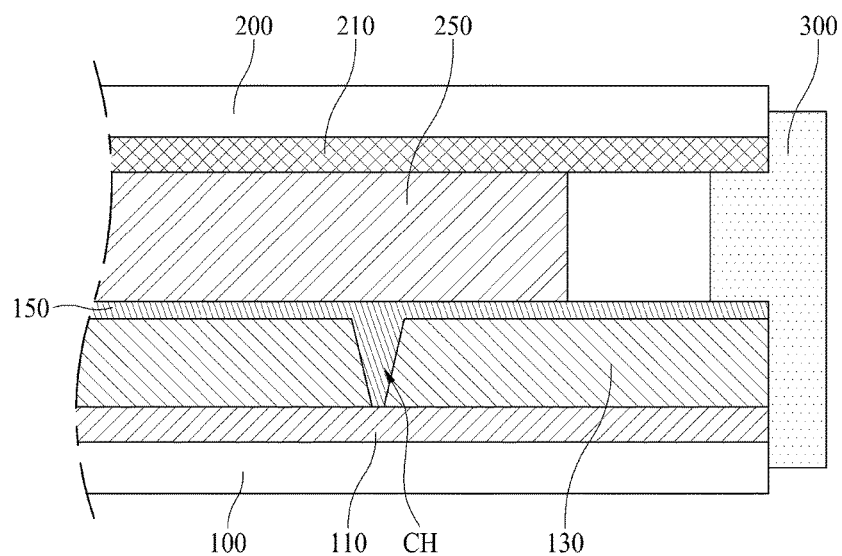

FIG. 9A is a schematic lateral perspective view of a display device according to still another embodiment of the present invention and FIG. 9B is a schematic cross-sectional view of the display device according to still another embodiment of the present invention. FIG. 9A corresponds to a lateral perspective view when viewed from direction A in FIG. 7 and FIG. 9B corresponds to a cross-sectional view taken along line I-I in FIG. 7.

In the embodiment illustrated in FIGS. 9A and 9B, an auxiliary electrode 150 is additionally formed in the embodiment illustrated in FIG. 8. Therefore, the same elements will be referenced by the same reference numerals, descriptions thereof will not be repeated for brevity, and the auxiliary electrode 150, which is additionally formed, will be described in detail.

Referring to FIG. 9A, the pads 110 are formed on a top face of the first substrate 100, the insulating layer 130 is formed on top faces of the pads 110, and the auxiliary electrodes 150 are formed on a top face of the insulating layer 130.

The auxiliary electrodes 150 are connected to the pads 110. Specifically, contact holes CH are formed in the insulating layer 130 to expose top faces of the pads 110, and the auxiliary electrodes 150 are connected to the pads 110 via the contact holes CH. Here, the contact holes CH do not overlap the spread-prevention holes PH.

The auxiliary electrodes 150 can be formed of the same transparent conductive material in the same step as the pixel electrodes formed in the display area DA, but the present invention is not limited thereto. For example, the auxiliary electrodes 150 may be formed of the same metal material in the same step as the data lines formed in the display area DA.

The auxiliary electrodes 150 are also connected to the connection electrodes 300. In this way, by additionally forming the auxiliary electrodes 150 connected to the pads 110 and the connection electrodes 300, it is possible to improve electrical connection characteristics between the pads 110 and the connection electrodes 300. This will be described in detail with reference to FIG. 9B.

Referring to FIG. 9B, the pads 110, the insulating layer 130, and the auxiliary electrodes 150 are sequentially formed on a top face of the first substrate 100. The contact holes CH are formed in the insulating layer 130, and the auxiliary electrodes 150 are connected to the pads 110 via the contact hole CH.

The auxiliary electrodes 150 extend to an end of the first substrate 100, similar to the pads 110. Accordingly, the connection electrodes 300 are connected to end faces of the pads 110, end faces of the auxiliary electrodes 150, and top faces of the auxiliary electrodes 150. According to still another embodiment of the present invention, the connection electrodes 300 can thus be additionally connected to the auxiliary electrodes 150 connected to the pads 110, and it is thus possible to improve the electrical connection characteristics between the pads 110 and the connection electrodes 300.

Figure 10:
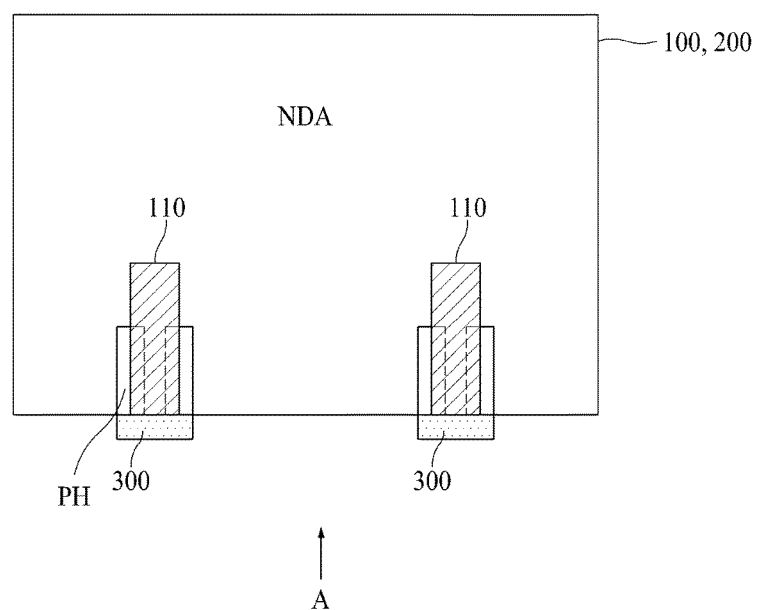
FIG. 10 is a schematic plan view of a display device according to still another embodiment of the present invention.

FIG. 10 is a schematic plan view of a display device according to still another embodiment of the present invention and illustrates two pads 110 formed in a non-display area NDA of the display device and two connection electrodes 300. The embodiment illustrated in FIG. 10 is different from the embodiment illustrated in FIG. 7 in that the spread-prevention holes PH overlap the pads 110.

In the embodiment illustrated in FIG. 7, the spread-prevention holes PH are separated from the pads 110 with a predetermined distance therebetween on both sides of the pads 110. However, in the embodiment illustrated in FIG. 10, the spread-prevention holes PH are formed to overlap the pads 110 on both sides of the pads 110.

In this way, when the spread-prevention holes PH are formed to overlap the pads 110, a contact area of the auxiliary electrode (see reference numeral 150 in FIG. 11) and the connection electrode 300 increases at the time of forming the auxiliary electrode (see reference numeral 150 in FIG. 11) connected to the pad 110 and it is thus possible to improve the electrical connection characteristics between the pad 110 and the connection electrode 300. This will be described in detail with reference to FIG. 11.

Figure 11:
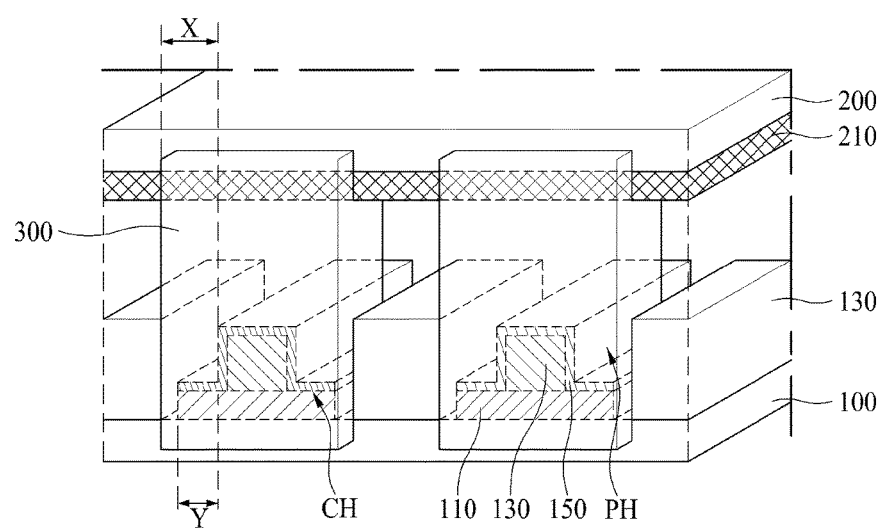
FIG. 11 is a schematic lateral perspective view of a display device according to still another embodiment of the present invention.

FIG. 11 is a lateral perspective view of a display device according to still another embodiment of the present invention and corresponds to a lateral perspective view when viewed from direction A in FIG. 10.

Referring to FIG. 11, the pads 110 are formed on a top face of the first substrate 100, the insulating layer 130 is formed on top faces of the pads 110, and the auxiliary electrodes 150 are formed on a top face of the insulating layer 130.

The spread-prevention holes PH and the contact holes CH are formed in the insulating layer 130. The auxiliary electrodes 150 are connected to the pads 110 via the contact holes CH.

The spread-prevention holes PH and the contact holes CH are formed to overlap the pads 110. The spread-prevention holes PH and the contact hole CH come in contact with each other. The spread-prevention hole PH corresponds to an area indicated by X in FIG. 11, and the contact hole CH corresponds to an area indicated by Y in FIG. 11.

Since the spread-prevention hole PH and the contact hole CH come in contact with each other while overlapping the pad 110 in this way, a space between one side face of the auxiliary electrode 150 and one side face of the insulating layer 130 forms the spread-prevention hole PH. Here, one side face of the auxiliary electrode 150 defining the spread-prevention hole PH means a side face extending in a direction substantially perpendicular to an end of the auxiliary electrode 150. One side face of the auxiliary electrode 150 is exposed to the spread-prevention hole PH and comes in contact with the spread-prevention hole PH. Accordingly, the connection electrode 300 can permeate the spread-prevention hole PH and be connected to one side face of the auxiliary electrode 150, and it is thus possible to increase a contact area of the connection electrode 300 and the auxiliary electrode 150.

In the embodiment illustrated in FIGS. 9A and 9B, the connection electrode 300 comes in contact with an end face of the auxiliary electrode 150 and a top face of the auxiliary electrode 150. However, in the embodiment illustrated in FIG. 11, the connection electrode 300 comes in contact with an end face of the auxiliary electrode 150 and a top face of the auxiliary electrode 150 and also comes in contact with one side face of the auxiliary electrode 150. Accordingly, in the embodiment illustrated in FIG. 11, it is possible to increase a contact area between the auxiliary electrode 150 and the connection electrode 300 and to improve the electrical connection characteristics between the pad 110 and the connection electrode 300.

According to the aspect of the present invention, since the connection electrode is connected to one side face of the pad on the side faces of the first substrate and the second substrate and thus the flexible printed circuit film is bonded to the side faces of the first substrate and the second substrate, it may not be necessary to extend the first substrate more than the second substrate in order to expose the top face of the pad to the outside as in the related art. Accordingly, it is possible to reduce a bezel area. Since both ends of the first substrate and the second substrate substantially match each other, it is possible to reduce or prevent a stepped portion in the bezel area.

According to the aspect of the present invention, the spread-prevention hole for reducing or preventing the connection electrode from spreading is formed in the insulating layer disposed on the pad. Accordingly, even when the connection electrode is pressurized and spread horizontally, it is possible to reduce or prevent neighboring connection electrodes from being short-circuited.

While the embodiments of the invention have been described above with reference to the accompanying drawings, the invention is not limited to the embodiments, but can be modified in various forms without departing from the technical spirit of the invention. Therefore, the above-mentioned embodiments of the invention are not provided for defining the technical spirit of the invention but for explaining the technical spirit thereof, and the scope of the invention is not limited to the embodiments. Accordingly, it should be understood that the above-mentioned embodiments are exemplary in all the points of view and are not restrictive. It should be construed that the scope of the invention is defined by only the appended claims and all technical concepts equivalent thereto are included in the scope of the invention.

According to an aspect of the present disclosure, a display device may comprise: a first substrate and a second substrate that face each other; a pad on the first substrate; an insulating layer on the pad; and a connection electrode connected to an end face of the pad, wherein the insulating layer includes a spread-prevention hole that prevents the connection electrode from spreading.

The spread-prevention hole may be provided in at least one of one side and the other side of the pad and the connection electrode may be provided to permeate the prevention hole.

The spread-prevention hole may be disposed to overlap the pad.

The display device may further comprise an auxiliary electrode that is connected to the pad via a contact hole provided in the insulating layer, wherein the connection electrode is connected to the auxiliary electrode.

The auxiliary electrode may be on a top face of the insulating layer, and the connection electrode may be connected to an end face of the auxiliary electrode and a top face of the auxiliary electrode.

The spread-prevention hole may be in contact with the contact hole.

The one side face of the auxiliary electrode may be exposed to the spread-prevention hole.

The connection electrode may be connected to the end face of the auxiliary electrode, the top face of the auxiliary electrode, and one side face of the auxiliary electrode.

The first substrate and the second substrate may be bonded to each other with a sealant, and the connection electrode may be disposed in an area between the first substrate and the second substrate in which the sealant is not provided and the sealant may be provided not to permeate the prevention hole.

One end of the first substrate and one end of the second substrate may match each other in a region in which the pad is connected to the connection electrode.

The connection electrode may be in contact with a side face of the first substrate and a side face of the second substrate.

According to another aspect of the present disclosure, a display device may comprise: a display panel comprising a first substrate and a second substrate facing each other; and a flexible printed circuit film bonded to a side face of the display panel; wherein in an area of the display panel, where the flexible printed circuit film is bonded to the side face of the display panel, an end of the first substrate and an end of the second substrate match each other.

The display device may further comprise at least one wiring and at least one pad connected to the at least one wiring, wherein the at least one pad is disposed between the first substrate and the second substrate in the area of the display panel where the end of the first substrate and the end of the second substrate match each other, and wherein the flexible printed circuit film is connected to a side face of the at least one pad.

The display device may further comprise at least one connection electrode on the side face of the at least one pad, wherein the flexible printed circuit film is bonded to the at least one connection electrode.

The at least one connection electrode may be in contact with a side face of the first substrate corresponding to the end of the first substrate and with a side face of the second substrate corresponding to the end of the second substrate, and may be connected directly to the side face of the at least one pad.

The display device may further comprise an adhesive layer between the at least one connection electrode and the flexible printed circuit film to bond the flexible printed circuit film to the at least one connection electrode.

The adhesive layer may comprise an adhesive base material and conductive balls within the adhesive base material to electrically connect the at least one connection electrode with the flexible printed circuit film.

The at least one connection electrode may extend to an area between the first substrate and the second substrate.

The display device may further comprise: an insulating layer disposed on a top face of the first substrate and disposed on at least a portion of a top face of the at least one pad; and at least one auxiliary electrode on the insulating layer and connected to the at least one connection electrode and further connected to the at least one pad via at least one contact hole in the insulating layer.

The at least one wiring may comprise a plurality of wirings, the at least one pad may comprise a plurality of pads, each pad of the plurality of pads may be connected to a respective wiring of the plurality of wirings, the at least one connection electrode may comprise a plurality of connection electrodes, each connection electrode of the plurality of connection electrodes may be connected to a respective pad of the plurality of pads, and the flexible printed circuit film may be connected to the plurality of connection electrodes.

The display device may further comprise: an insulating layer disposed on a top face of the first substrate and disposed on at least a portion of a top face of the plurality of pads; and at least one spread prevention hole in the insulating layer between at least two neighboring pads of the plurality of pads.

The at least one spread prevention hole may be separated from the at least two neighboring pads.

The at least one spread prevention hole may overlap one of the at least two neighboring pads.

The display device may further comprise a sealant disposed between the first substrate and the second substrate, wherein the sealant does not extend to the at least one spread-prevention hole.

The display device may further comprise a plurality of auxiliary electrodes on the insulating layer, wherein each auxiliary electrode of the plurality of auxiliary electrodes is connected to a respective pad of the plurality of pads via at least one contact hole in the insulating layer and is connected to a respective connection electrode of the plurality of connection electrodes.

Each connection electrode may be in contact with the side face of the respective pad, and with an end face and a top face of the respective auxiliary electrode.

Each connection electrode may be connected with the side face of the respective pad, and with an end face, a top face and a side face of the respective auxiliary electrode.

It will be apparent to those skilled in the art that various modifications and variations can be made in the disclosed subject matter without departing from the spirit or scope of the disclosed subject matter. Thus, it is intended that the present invention covers the modifications and variations of this invention provided they come within the scope of the appended claims and their equivalents.

What is claimed is:
1. A display panel, comprising:
a first substrate and a second substrate facing each other;
a first pad and a second pad between the first substrate and the second substrate at an end of the first substrate;
a first connection electrode on a side face of the first pad and a second connection electrode on a side face of the second pad;

an insulating layer disposed on a top face of the first substrate and disposed on at least a portion of a top face of the first and second pads; and at least one spread prevention hole in the insulating layer between the first and second pads, wherein the spread prevention holes have spaces accommodating the connection electrodes and at least one of the first and second connection electrodes permeate the spread prevention holes.

2. The display panel of claim 1, wherein the side face of the first pad and the side face of the second pad correspond to the end of the first substrate, and wherein an end of the at least one spread prevention hole is exposed at the end of the first substrate.

3. The display panel of claim 1, wherein the end of the first substrate and an end of the second substrate substantially match each other.

4. The display panel of claim 1, wherein the at least one spread prevention hole is separated from the first and second pads.

5. The display panel of claim 1, wherein the at least one spread prevention hole overlaps one of the first and second pads.

6. The display panel of claim 1, further comprising a sealant disposed between the first substrate and the second substrate, wherein the sealant is separated from the at least one spread-prevention hole.

7. The display panel of claim 1, further comprising a first auxiliary electrode and a second auxiliary electrode on the insulating layer, wherein the first auxiliary electrode is connected to the first pad via at least one first contact hole in the insulating layer and is connected to the first connection electrode, and wherein the second auxiliary electrode is connected to the second pad via at least one second contact hole in the insulating layer and is connected to the second connection electrode.

8. The display panel of claim 7, wherein the at least one spread prevention hole is separated from the first and second pads, and each connection electrode is in contact with the side face of the respective pad, and with an end face and a top face of the respective auxiliary electrode.

9. The display panel of claim 7, wherein the at least one spread prevention hole overlaps one of the first and second pads, and each connection electrode is connected with the side face of the respective pad, and with an end face, a top face and a side face of the respective auxiliary electrode.

10. The display panel of claim 7, wherein the spread-prevention hole is in contact with the at least one first contact hole or the at least one second contact hole.

11. The display panel of claim 7, wherein a side face of the first auxiliary electrode or a side face of the second auxiliary electrode is exposed the at least one spread-prevention hole.

12. A display device, comprising:
a display panel according to any one of claim 1; and
a flexible printed circuit film bonded to a side face of the display panel.

13. The display device of claim 12, wherein the flexible printed circuit film is bonded to the side face of the first pad or to the side face of the second pad.

14. The display device of claim 12, further comprising an adhesive layer between the first connection electrode and the flexible printed circuit film or between the second connection electrode and the flexible printed circuit film to bond the flexible printed circuit film to the first and/or second connection electrode, wherein the adhesive layer comprises an adhesive base material and conductive balls within the adhesive base material to electrically connect the first or connection electrode with the flexible printed circuit film.

15. The display device of claim 12, further comprising:
a backlight unit; and
a buffer member between the flexible printed circuit film and the backlight unit.

16. The display device of claim 15, wherein the backlight unit comprises:
a guide panel that supports the display panel;
a lower case coupled to the guide panel;
wherein the buffer member is disposed between the flexible printed circuit film and the guide panel.

17. A display device, comprising:
a display panel having a first substrate and a second substrate facing each other;
a sealant between the first substrate and the second substrate;
a first pad and a second pad at an end of the first substrate;
a first connection electrode and a second connection electrode in contact with a side face of the first substrate and a side face of the second substrate, the first connection electrode and the second connection electrode are connected directly to one side face of the first pad and the second pad, respectively;
an insulating layer on the first substrate and at least a portion of a top face of the first and second pads, the insulating layer having at least one spread prevention hole;
a flexible printed circuit film disposed vertically on the side faces of the first substrate and the second substrate; and
a printed circuit board on the flexible printed circuit film supplying various signals to the display panel via the flexible printed circuit film,
wherein the first and second connection electrodes are connected to the pads on the side faces of the first substrate and the second substrate, the flexible printed circuit film is bonded to the side faces of the first substrate and the second substrate, thereby reducing a bezel area and preventing a stepped portion in the bezel area of the display panel.

18. The display device of claim 17, further comprising the auxiliary electrodes including a first auxiliary electrode and a second auxiliary electrode, wherein the first auxiliary electrode and the second auxiliary electrode are connected to the first pad and the second pad, respectively via the contact holes in the insulating layer.

19. The display device of claim 18, wherein the contact holes do not overlap the spread prevention holes.

20. The display device of claim 19, wherein the auxiliary electrodes extend to an end of the first substrate and the connection electrodes are connected to end faces of the first pad and the second pad, end faces of the auxiliary electrodes and top faces of the auxiliary electrodes.

21. The display device of claim 18, wherein the spread prevention holes and the contact holes overlap the pads and the spread prevention holes and the contact holes come in contact with each other.

22. The display device of claim 21, wherein one side face of the auxiliary electrodes are exposed to the spread prevention holes and come in contact with the spread prevention holes and the connection electrodes permeate the spread prevention holes and are connected to one side face of the auxiliary electrodes.

23. The display device of claim 17, wherein the sealant does not extend to the spread prevention holes.

* * * * *